United States Patent [19]

Hosokawa et al.

[11] Patent Number: 5,565,501
[45] Date of Patent: *Oct. 15, 1996

[54] ACTIVE-ENERGY-RAY-CURABLE COATING COMPOSITION

[75] Inventors: Noritaka Hosokawa; Kazuhide Hayama, both of Yokkaichi, Japan

[73] Assignee: Mitsubishi Chemical Corporation, Tokyo, Japan

[ * ] Notice: The term of this patent shall not extend beyond the expiration date of Pat. No. 5,409,965.

[21] Appl. No.: 422,947

[22] Filed: Apr. 17, 1995

[30] Foreign Application Priority Data

Apr. 18, 1994 [JP] Japan ..................... 6-078898

[51] Int. Cl.⁶ ..................... C08F 2/46
[52] U.S. Cl. .............. 522/83; 522/84; 522/104; 522/107; 522/121; 522/179
[58] Field of Search ............... 522/83, 84, 104, 522/107, 121, 179

[56] References Cited

U.S. PATENT DOCUMENTS 4,496,686  1/1985  Ansel .................... 524/850
5,409,965  4/1995  Hosokawa et al. .......... 522/83

OTHER PUBLICATIONS

Patent Abstracts of Japan, AN 84-097011/16, JP-A-59 041366; Mar. 7, 1984.
Patent Abstracts of Japan, AN 88-15177/22, JP-A-63092675, Apr. 23, 1988.
Patent Abstracts of Japan, AN 76-11891X/07, JP-A-50082173, Jul. 3, 1975.
Patent Abstracts of Japan, AN 78-90914A/50, JP-A-78043553, Nov. 21, 1978.
Patent Abstracts of Japan, AN 90-326128/43, JP-A-02735909; Sep. 18, 1990.
U.S. Abstracts, AN 93-322298/41, US-A-5,378,735, Jan. 3, 1995.

*Primary Examiner*—Mark Chapman
*Attorney, Agent, or Firm*—Oblon, Spivak, McClelland, Maier & Neustadt, P.C.

[57] ABSTRACT

The present invention provides a composition comprising (a) a carboxyl-group containing multifunctional acrylate; (b) a multifunctional acrylate having three or more acryloyl groups in the molecule; (c) an organic solvent; and optionally, (d) a photopolymerization initiator, (e) a colloidal metal oxide and (f) an acrylic resin is provided. This composition is applied to a plastic substrate and then irradiated with active energy rays, thereby forming a hard-coating layer having good adhesiveness to the substrate, transparency and hardwearing properties.

9 Claims, No Drawings

ACTIVE-ENERGY-RAY-CURABLE COATING COMPOSITION

BACKGROUND OF THE INVENTION

1. Field of the Invention

This invention relates to an active-energy-ray-curable coating composition which can form a hard-coating layer which has excellent adhesiveness to plastic substrates, transparency, and hardwearing properties. Further, this invention relates to an active-energy-ray-curable coating composition which can form a coating film upon evaporation of the solvent through drying and then can be subjected to processing such as molding, printing and transfer before curing the film by active-energy-ray. The obtained cured article has an excellent hardwearing properties.

2. Discussion of the Background

Generally speaking, plastics, for example, polycarbonate, polymethyl methacrylate, polyethylene terephthalate, polyvinylchloride, ABS resin and cellulose acetate are used for various fields due to their light weight, high workability, excellent impact resistance, etc. However, because of their poor surface hardness, these plastic products are liable to have surface flaws, so that it is difficult for them to be used in fields in which hardwearing properties is required. Thus, there is a demand for an active-energy-ray-curable hard coating material which imparts hardwearing properties to these plastic products.

Further, in some cases, a curable hard coating material can not be directly applied to the surface of the plastic product. Instead, it is applied to a separate substrate, such as a plastic film. Then, after such processes as printing or application of an adhesive layer have been performed on the surface of the plastic film as needed, the curable hard coating layer is transferred to the surface of the plastic product. In view of this, there is a demand for a coating composition which can form a curable coating film upon drying of the solvent, and then after irradiation with active-energy-ray, give a cured hardwearing coating.

Japanese Patent Publications No. 53-43553 and Japanese Patent Laid Open No. 50-82173 disclose an active-energy-ray-curable coating composition which forms a hardwearing coating on the plastic molded products. These coating materials contain (A) a multifunctional (meth)acrylate having at least three functional acryloyl groups, (B) organic solvent and (C) photopolymerization initiator. Further, Japanese Patent Laid Open No. 63-92675 discloses that a colloidal silica is added to these active-energy-ray curable coating composition to improve their hardwearing properties. Japanese Patent Laid Open No. 59- 41366 discloses a coating hardenable resin composition comprising (a) poly-((meth)acryloyloxyalkyl)isocyanurate compound, (b) urethane poly(meth)acrylate, (c) polymerisation initiator and (d) inorganic filler. Some of these active-energy-ray-curable hard coating materials give a coating film having excellent hardwearing properties. However, none of these films exhibit adhesiveness that would be acceptable to any type of plastic substrate. Under the circumstances, a primer has to be first coated on the surface of the plastic substrate, and then, the coating compositions are applied to this primer surface of the plastic substrates.

U.S. Pat. No. 5,378,735 discloses an ultraviolet-ray-curable composition composed of: (a) a compound obtained by reacting a silane coupling agent containing isocyanate groups with a multifunctional acrylate containing hydroxyl groups; (b) a multifunctional acrylate having at least three acryloyl groups in the molecule; (c) silica sol in an organic solvent; and (d) a photopolymerization initiator. This composition, however, exhibited a rather unsatisfactory adhesiveness when cellulose acetate was used as the substrate.

To improve the adhesiveness to plastic substrate, it might be possible to use a compound having one or more carboxyl groups and one (meth)acryloyl group in the molecule (as disclosed in Japanese Patent Laid Open No. 2-235909), as a component of the active-energy-ray-curable hard coating composition. However, using such a monofunctional (meth)acrylate results in a great reduction in the crosslinking density of the (meth)acryloyl groups of the coating, so that it is impossible to obtain a coating film having a satisfactory level of hardwearing properties.

SUMMARY OF THE INVENTION

Accordingly, one object of the present invention is to provide an active-energy-ray-curable coating composition which can form a hard-coating layer which has excellent adhesiveness to plastic substances, transparency and hardwearing properties.

The present inventors have now found that this and other objects can be achieved using an active-energy-ray-curable coating composition comprising:

(a) a carboxyl-group containing multifunctional acrylate obtained by reacting a compound having one or more acid-anhydride groups in the molecule with a hydroxyl-group containing multifunctional acrylate having a hydroxyl group and at least three acryloyl groups in the molecule;

(b) a multifunctional acrylate having three or more acryloyl groups in the molecule;

(c) an organic solvent; and (d) optionally, a photopolymerization initiator.

wherein the ratio by weight of component (b) to component (a) is 0.01 to 2, wherein the amount of component (c) is large enough to dissolve components (a) and (b), and wherein the amount of component (d) is 0 to 10% by weight of the sum of the weights of components (a) and (b).

The present invention also provides an active-energy-ray-curable coating composition which contains, in addition to the components of the above composition, a component (e), which is a colloidal metal oxide, in such a proportion that component (e)/{component (a)+component (b)} is 0.01 to 10 by weight.

Further, the present invention provides an active-energy-ray-curable coating composition which contains, in addition to the above components (a), (b), (c) and (d), a colloidal metal oxide (e) and an acrylic resin having a molecular weight of 50,000 to 500,000, wherein the ratio of component (e)/{component (a)+ component (b)} is 0.01 to 10 by weight and component (f)/{component (a)+ component (b)+ component (e)} is 0.01 to 0.5 by weight.

This coating composition is coated firstly on the surface of plastic film or substrate, secondly a coating film is formed upon drying of the solvent, and such processes as printing and transfer can be performed prior to the irradiation of the activation energy rays.

The cured hard-coating film from a coating composition of the present invention have an excellent adhesiveness to the plastic product or substrate, transparency and hardwearing properties. Further, it is also possible that a coating film can be formed upon drying of the solvent. After performing such processes as printing and transfer on this coating film, activation energy rays are applied thereto. The cured hard-coating film layer has excellent hardwearing properties.

DETAILED DESCRIPTION OF THE INVENTION

The present invention will now be described in more detail.

Component (a):

Component (a) is a carboxyl-group containing multifunctional acrylate obtained by reacting a compound (i) having one or more acid anhydride groups in the molecule with a hydroxyl-group containing multifunctional acrylate (ii) having a hydroxyl group and at least three acryloyl groups in the molecule.

Specific-examples of the compound (i) having one or more acid anhydride groups in the molecule include compounds having one acid anhydride group such as succinic anhydride, 1-dodecenyl succinic anhydride, maleic anhydride, glutaric anhydride, itaconic anhydride, phthalic anhydride, hexahydrophthalic anhydride, methylhexahydrophthalic anhydride, tetramethylene maleic anhydride, tetrahydrophthalic anhydride, methyltetrahydrophthalic anhydride, endomethylene tetrahydrophthalic anhydride, methylendomethylene tetrahydrophthalic anhydride, tetrachlorophthalic anhydride, tetrabromophthalic anhydride, chlorendic anhydride, and trimellitic anhydride; compounds having two acid anhydride groups such as pyromellitic dianhydride, 3,3',4,4'-benzophenone tetracarboxylic dianhydride, 4,4'-biphthalic anhydride, 4,4'-oxodiphthalic anhydride, 4,4'-(hexafluoroisopropylidene) diphthalic anhydride, 1,2,3,4-cyclopentane tetracarboxylic dianhydride, 5-(2,5-dioxotetra-hydrofuryl)- 3-methyl-3-cyclohexene-1,2-dicarboxylic anhydride, 4-(2,5-dioxotetrahydrofuran-3-yl)-tetralin-1,2-dicarboxylic anhydride, 3,4,9,10-perylene tetracarboxylic dianhydride, and bicyclo [2.2.2] octo-7-en-2,3,5,6-tetracarboxylic dianhydride; and mixtures of two or more of these compounds. Preferably, when a compound having two acid anhydride groups is used, the resultant carboxyl group containing multifunctional acrylate contains 3 to 10 acryloyl groups and 2 to 3 carboxyl groups in the same molecule, which is particularly desirable from the viewpoint of hardwearing properties and adhesiveness.

Specific examples of the hydroxyl-group containing multifunctional acrylate (ii) having a hydroxyl group and three or more acryloyl groups in a molecule includes: pentaerythritol triacrylate, dipentaerythritol tetraacrylate, dipentaerythritol pentaacrylate, and mixtures of these compounds.

When the reaction of the compound (i) having one or more anhydride groups in the molecule with the hydroxyl-group containing multifunctional acrylate (ii) having a hydroxyl group and three or more acryloyl groups in the molecule is carried out, they are mixed with each other such that the mole ratio of (hydroxyl-group containing multifunctional acrylate (ii))/(compound (i) having anhydride groups) is 1 or more, and the mixture is stirred at 60° to 110° C. for 1 to 20 hours. This reaction can be carried out in the presence of (b) a multifunctional acrylate having at least three acryloyl groups in the molecule, (c) an organic solvent having no active hydrogen.

To prevent polymerization due to the acryloyl groups in the reaction, it is desirable to add a polymerization inhibitor to the composition such as hydroquinone, hydroquinone monomethyl ether, catechol, p-t-butyl catechol, phenothiazine, and the like. The amount of this polymerization inhibitor to the reactants (i) and (ii) is preferably 0.01 to 1 wt %, and more preferably, 0.05 to 0.5 wt %.

Further, to promote the reaction, it is possible to use a catalyst, for example, N,N-dimethyl benzylamine, triethylamine, tributylamine, triethytene diamine, benzyl trimethyl ammonium chloride, benzyl trimethyl ammonium bromide, tetramethyl ammonium bromide, cetyltrimethyl ammonium bromide, or zinc oxide. The amount of the catalyst is preferably 0.01 to 5 wt %, and more preferably, 0.05 to 2 wt % with respect to the reaction mixture.

The resultant carboxyl-group containing multifunctional acrylate (a) does not undergo a reduction in acryloyl group density even when mixed with component (b), i.e., the multifunctional acrylate. The hard-coated film of the present invention exhibits a satisfactory adhesiveness to various types of plastic products or substrates and excellent hardwearing properties.

Component (b):

Component (b) is a multifunctional acrylate having three or more acryloyl groups in the molecule. Specific examples of this component include trimethylolpropane triacrylate, EO-modified trimethylolpropane triacrylate, PO-modified trimethylolpropane triacrylate, tris (acryloxyethyl) isocyanurate, caprolactone-modified tris(acryloyloxyethyl)isocyanulate, pentaerythritol triacrylate, pentaerythritol tetraacrylate, dipentaerythritol tetraacrylate, dipentaerythritol pentaacrylate, dipentaerythritol hexaacrylate, alkyl-modified dipentaerythritol triacrylate, alkyl-modified dipentaerythritol tetraacrylate, alkyl-modified dipentaerythritol pentaacrylate, caprolactone-modified dipentaerythritol hexaacrylate, and a mixture of two or more of these substances. Of these, dipentaerythritol hexaacrylate, dipentaery-thritol pentaacrylate, and mixtures of the two are particularly desirable from the viewpoint of hardwearing properties.

The ratio by weight of (component (b))/(component (a)) is 0.01 to 2, and more preferably, 0.1 to 2. When the ratio is greater than 2, the amount of carboxyl groups is rather too small, so that the adhesiveness of the resultant coating to various plastic substrate becomes unsatisfactory.

Component (c):

Examples of the organic solvent include aromatic hydrocarbons, such as toluene and xylene; esters such as ethyl acetate, propyl acetate, and butyl acetate; alcohols such as methyl alcohol, ethyl alcohol, n-propyl alcohol, isopropyl alcohol, and n-butyl alcohol; ketones such as acetone, methyl ethyl ketone, methyl isobutyl ketone, and cyclohexanone; ethers such as 2-methoxyethanol, 2-ethoxyethanol, 2-butoxyethanol, ethyleneglycol dimethyl ether, ethyleneglycol diethyl ether, and diethyleneglycol dimethyl ether; and ether esters, such as 2-methoxyethylacetate, 2-ethoxyethylacetate, and 2-butoxyethylacetate. It is also possible to use a combination of these solvents.

These organic solvents are used for the purpose of adjusting the viscosity of the present active-energy-ray-curable coating composition and when producing a component (f) described below. Further, of the organic solvents, those which have no active hydrogen may also be used as a solvent for producing component (a). The amount of organic solvent is preferably 0.1 to 1000 parts by weight, and more preferably, 30 to 300 parts by weight, with respect to 100 parts by weight of the sum total of components (a) and (b). It is desirable for this organic solvent to have a boiling point of 50° to 160° C from the viewpoint of the drying properties of the coating composition.

Component (d):

When using ultraviolet rays as the activation energy rays, a polymerization initiator is used in addition to the above components (a) through (c). Examples of the polymerization initiator include benzoin methylether, benzoin ethylether, benzoin isopropylether, benzoin butylether, diethoxyacetophenone, benzyl dimethylketal, 2-hydroxy-2-methylpropiophenone, 1-hydroxycyclohexyl phenylketone, benzophenone, 2,4,6-trimethylbenzoindiphenyl phosphine oxide, 2-methyl-[4-(methylthio) phenyl]-2-morpholino-1-propanone, 2-benzyl-2-dimethylamino-1-(4-morpholinophenyl)-butane- 1-on, Michler's ketone, N,N-diethylamino isoamylbenzoate, 2-chlorothioxantone, and 2,4-diethyl thioxantone. It is also possible for two or more of these polymerization initiators to be appropriately combined. The amount of the polymerization initiator used is preferably 0.1 to 10 parts by weight, and more preferably, 1 to 5 parts by weight, with respect to 100 parts by weight of the sum total of components (a) and (b).

Component (e):

An active-energy-ray-curable coating composition having a still higher level of hardwearing properties can be obtained by adding a component (e), which is a colloidal metal oxide, to the above-described active-energy-ray-curable-coating composition composed of the above components (a), (b), (c) and (d).

A suitable example of this colloidal metal oxide can be obtained by dispersing a metal oxide in an organic solvent, such as methyl alcohol, ethyl alcohol, isopropyl alcohol, n-butanol, methylethylketone, 2-ethoxy ethanol, toluene, or xylene, or water so as to obtain a colloidal substance having an average grain size of 1 to 100 nm, and, in particular, 3 to 20 nm. Preferably, from the viewpoint of compatibility in the system of the composition of the present invention, a colloidal metal oxide dispersed and stabilized in an organic solvent can be suitably used. When a colloidal metal oxide having an average grain size of smaller than 1 nm is used, the surface hardness cannot be enhanced in some cases. On the other hand, when a colloidal metal oxide having an average grain size that is larger than 100 nm is used, the transparency of the hard-coating may be lost.

Specific-examples of this colloidal metal oxide include colloidal silica, colloidal titanium oxide, colloidal antimony oxide, colloidal zinc oxide, colloidal tin oxide, and colloidal tungsten oxide. It is possible to use one or more of these substances. Further, it is also possible to use a mixed crystal sol, such as antimony-oxide/silica sol, titanium-oxide/silica sol, cerium-oxide/titanium-oxide sol, iron-oxide/titanium-oxide sol, antimony-oxide/titanium-oxide sol, and tungsten-oxide/tin-oxide sol. Preferably, colloidal silica, colloidal antimony oxide, and colloidal zinc oxide are particularly preferable due to their excellent dispersiveness in coating compositions.

When adding component (e), the ratio by weight component (e)/{component (a)+ component (b)} is preferably 0.01 to 10, and, more preferably, 0.01 to 5. When this ratio by weight is greater than 10, the crosslinking density ,due to the acryloyl groups in the components (a) and (b) decreases, resulting in a deterioration in hardwearing properties.

Component (f):

When a component (f), which is an acrylic resin, is added to the above-described active-energy-ray-curable coating composition composed of the components (a), (b), (c), (d) and (e), component (f) makes it easy to perform processes comprising:

(i) coating the composition onto a plastic film;

(ii) drying the solvent to form a film of curable composition on the plasatic film;

(iii) performing a printing or transferring process; and (iv) irradiating active-energy-ray to cure the coating film.

The obtained cured hard-coating layer has excellent hardwearing properties and adhesiveness to the plastic: product (film) or substrate.

It is desirable for the acrylic resin constituting component (f) to be a compound which has a molecular weight of approximately 50,000 to 500,000 and which is selected from the compounds listed in (A) through (C) below:

(A) Polymer or copolymer of (meth)acrylic ester

Examples of a polymer or copolymer of (meth)acrylic ester include polymers of monomers (I) or copolymers of two or more kinds of monomers (I) having (metha) acryloyl groups, such as methacrylic acid and acrylic acid [hereinafter the two will be referred to as "(metha) acrylic acid"], methyl (meth)acrylate, ethyl (meth)acrylate, n-butyl (meth)acrylate, iso-butyl (meth)acrylate, 2-ethylhexyl (meth)acrylate, benzyl (meth)acrylate, cyclohexyl (meth)acrylate, isobornyl (meth)acrylate, dicyclopentenyl (meth)acrylate, dicyclopentenyl oxyethyl (meth)acrylate, cyanoethyl (meth)acrylate, glycidyl (meth)acrylate, 2-hydroxyethyl (meth)acrylate, and 2-hydroxypropyl(meth)acrylate.

(B) Compound having (meth)acryloyl groups in the side chain of polymers or copolymers of (meth)acrylic ester Examples of the compound having (meth)acryloyl groups in the side chain of polymers or copolymers of (meth)acrylic ester include a (meth)acrylic-acid adduct obtained by adding (meth)acrylic acid to polymer of glycidyl (meth)acrylate or copolymer having glycidyl (meth)acrylate as a component; a glycidyl-(meth)acrylate adduct obtained by adding glycidyl (meth)acrylate to a copolymer having (meth)acrylic acid as a component; and an adduct obtained by adding isocyanate group containing urethane (meth)acrylic ester to a copolymer having a hydroxyl group containing (meth)acrylic ester as a component.

(C) Acrylic silicon resin having alkoxysilyl groups

An acrylic silicon resin having alkoxysilyl groups is a polymer composed of the above-mentioned monomers (I) having (meth)acryloyl groups arid monomers (II) having alkoxysilyl groups reacting with the monomers (I).

Examples of monomers (II) include substances having polymerizing unsaturated double bonds which copolymerize with the monomers (I), such as γ-methacryloyloxypropyl trimethoxy silane, γ-methacryloyloxypropyl triethoxy silane, γ-methacryloyloxypropyl methyldimethoxy silane, vinyl trimethoxy silane, vinyl triethoxy silane, and vinyl tri(ethoxy methoxy) silane; and substances having functional groups which addition-react with the monomers (I), such as γ-glycidoxy propyl trimethoxy silane, γ-glycidoxy propyl methyldiethoxy silane, γ-isocyanate propyl trimethoxy silane, γ-isocyanate propyl triethoxy silane, γ-isocyanate propyl methyldimethoxy silane, γ-isocyanate propyl methyldiethoxy silane, γ-amino propyl trimethoxy silane, γ-amino propyl triethoxy silane, N-phenyl-γ -amino propyl trimethoxy silane, γ-mercapto propyl trimethoxy silane, and γ-mercapto propyl triethoxy silane.

The acrylic silicon resin having alkoxysilyl groups is obtained through copolymerization of monomers (I) having (meth)acryloyl groups and monomers (II) having polymerizing unsaturated double bonds which copolymerize with the monomers (I) and alkoxysilyl groups. Further, the acrylic silicon resin having alkoxysilyl groups is obtained by addition reaction, and then, polymerization, of monomers (I) having (meth)acryloyl groups and monomers (II) having functional groups which addition-react with the monomers (I) and alkoxysilyl groups, or by first polymerizing monomers (I) having (meth)acryloyl groups and then subjecting this polymer to addition reaction with monomers (II) having functional groups which addition-react with the monomers (I) and alkoxysilyl groups.

The acrylic resin, which constitutes the above component (f), selected, for example, from the compounds of (A) to (C), is manufactured through ordinary polymerization in an organic solvent, which constitutes component (c), and addition reaction as needed.

Suitable examples of the polymerization initiator used in the polymerization include peroxides, such as benzoyl peroxide, di-t-butyl peroxide, and cumene hydroperoxide; and azo compounds, such as azobis isobutyronitrile, and azo bis valeronitrile. The monomer concentration is preferably 10 to 60 wt %, and the amount of polymerization initiator-is preferably 0.1 to 10 wt % with respect to the monomer mixture.

Further, during the addition reaction, for example, of epoxy groups and carboxyl groups, it is possible to use a catalyst such as N,N-dimethyl benzylamine, triethyl, amine, tributyl amine, triethylene diamine, benzyl trimethyl ammonium chloride, benzyl trimethyl ammonium bromide, tetramethyl ammonium bromide, cetyl trimethyl ammonium bromide, and triphenyl stibine. The amount of catalyst used is preferably 0.1 to 5 wt % with respect to the monomer mixture.

During the addition reaction of hydroxyl groups and isocyanate groups, it is possible to use a catalyst such as di-n-butyl tin dilaurate, and triethylene diamine. The amount of catalyst used is preferably 0.01 to 0.1 wt % with respect to the monomer mixture.

A particularly preferable acrylic resin to be used as component (f) is one in which the acrylic resin having hydroxyl or alkoxy silyl groups exhibits an excellent compatibility with components (a) and (b), and further wherein it is desirable that the component (f) be added in such an amount that the ratio by weight of component (f)/{component (a)+ component (b)+component (e)} ranges from 0.0] to 0.5. When this ratio by weight is more than 0.5, the hardwearing properties of the cured hard-coating undesirable deteriorates to a large degree.

To improve the physical properties of the hard-coating, it is possible for the active-energy-ray-curable coating compound to be mixed with an additive that is often added to this kind of composition, such as an ultraviolet ray absorbing agent, (for example, a benzotriazol type, benzophenone type, salicylic acid type, or cyano acrylate type ultraviolet ray absorbing agent), an ultraviolet ray stabilizer (for example, an ultraviolet ray stabilizer of hindered amine type), an oxidation inhibitor (for example, a phenol type, sulfur type, or phosphorus type oxidation inhibitor), a blocking inhibitor, a slipping agent, and a levelling agent.

The coating composition of the present invention can be applied to a plastic substrate such as polycarbonate, polymethyl methacrylate, polyethylene terephthalate, vinyl chloride resin, ABS resin, or cellulose acetate by the dipping method, flow coating method, spray method, bar coating method, or with an application machine by gravure coating, roll coating, blade coating, or air knife coating. After drying of the solvent and application of the active energy rays, a hard-coating layer having a thickness of 1 to 50 μm, and more preferably, 2 to 20 μm can be formed, on the surface of the plastic substrate. When the coating composition of the present invention contains an acrylic resin of the component (f), printing, embossing, molding, etc. are performed as needed after the drying of the solvent.

For the crosslinking and curing of the applied hard coating layer, it is possible to use active energy rays, for example, ultraviolet rays emitted from a light source, such as a xenon lamp, low-pressure mercury lamp, high-pressure mercury lamp, ultra-high-pressure mercury lamp, metal halide lamp, carbon arc lamp, or tungsten lamp, or electron ray, α-ray, β-ray, or γ-ray, emitted from an electron beam accelerator of 20 to 2000 kV.

EXAMPLES

The present invention will now be described in more detail with reference to specific examples, which, however, should not be construed restrictively. In the following examples, the terms "parts" and "%" mean "parts by weight" and "weight %", respectively.

Example 1

163 parts of a mixture of dipentaerythritol hexaacrylate and dipentaerythritol pentaacrylate containing 67 mole % of dipentaerythritol pentaacrylate (manufactured by Nippon Kayaku Co., Ltd.: KAYARAD DPHA, with a hydroxyl value of 69 mgKOH/g) and 21.8 parts of pyromellitic dianhydride were placed into a flask such that the mole ratio of (dipentaerythritol pentaacrylate)/(pyromellitic dianhydride) was 2, and 100 parts of methylethyl ketone, 0.1 parts of hydroquinone monomethyl ether, and 1 part of N,N-dimethyl benzyl amine were added thereto. The mixture was then allowed to react at 80° C for 8 hours. The resultant composition (I) included 65.0% solid portions and contained 44.3% of carboxyl group containing multifunctional acrylate and 20.4% of dipentaerythritol hexaacrylate.

100 parts of the composition (I) thus obtained was mixed with 70 parts of toluene and 1 part of benzyldimethylketal, thereby preparing an acquire-energy-ray-curable coating composition (A) having a composition as shown in Table 1.

This active-energy-ray-curable coating composition (A) was applied to a transparent polycarbonate plate having a thickness of 2 mm by using a bar coater, and dried by heating at 100° C. for 10 minutes to evaporate the methylethyl ketone and toluene, thereby obtaining a coating film having a thickness of 8 μm. This coating film was irradiated with ultraviolet rays for curing by using a high-pressure mercury lamp of an output power of 7.5 kw and output density of 120 w/cm, arranged perpendicular to the direction in which the specimen was passed, at a position 10 cm below the light source and at a conveyor speed of 2 m/min, thereby obtaining a cured hard-coating layer.

The adhesiveness of the hard-coating layer to the polycarbonate plate on which it was formed was examined as follows: the surface of the hard coating layer was marked off into 100 squares arranged at intervals of 1 mm by using a cutter knife, and a piece of adhesive cellophane tape (manufactured by Nichiban Co., Ltd.) was pressed onto these squares and then forcibly separated therefrom. The adhesiveness indicated by this test was 100/100, which is a satisfactory value (the cross-cut taping method: JIS K5400).

Further, the transparency of the polycarbonate plate having the above hard-coating layer thereon was evaluated in terms of haze value (%), which was a satisfactory value of 0 4%. The haze value of the polycarbonate plate of a thickness of 2 mm was 0.4 % prior to the application of the hard coating material (haze value= Td/Tt×100, Td: scattered light transmittance, Tt: total light transmittance JIS K7105).

Next, the hardwearing properties of the hard-coating layer was examined using a truck wheel CS-10F manufactured by Calibrase Co. The test was conducted as a 100 rev. Taber's abrasion resistance test under a load of 500 g. The difference ΔH between the haze value before and after the test was 5.4%, which is a satisfactory value. The value of ΔH obtained with respect to a polycarbonate plate of a thickness of 2 mm which had not undergone the hard-coating process was 46.7% (Taber's abrasion resistance test, ASTM D1044).

Example 2

86 parts of a mixture of pentaerythritol tetraacrylate and pentaerythritol triacrylate containing 73 mole % of pentaerythritol triacrylate (manufactured by Osaka Yuki Kagaku Kogyo Co., Ltd.: VISCOAT 300, with a hydroxyl value of 131 mgKOH/g) and 21.8 parts of pyromellitic dianhydride were placed into a flask such that the mole ratio of (pentaerythritol triacrylate)/(pyromellitic dianhydride) was 2, and 100 parts of methylethyl ketone, 0.1 parts of hydroquinone monomethyl ether, and 1 part of N,N-dimethyl benzyl amine were added thereto. The mixture was then allowed to react at 80° C. for 8 hours. The resultant composition (II) included 52.1% solid portions and contained 39.0% of carboxyl group containing multifunctional acrylate and 12.6% of pentaerythritol tetraacrylate.

100 parts of the composition (II) thus obtained was mixed with 15 parts of the same KAYARAD DPHA as used in Example 1, 70 parts of toluene and 1 part of benzyldimethylketal, thereby preparing an active-energy-ray-curable coating composition (B) having a composition as shown in Table 1.

Using this active-energy-ray-curable coating composition (B), a hard-coating-processed polycarbonate plate was obtained in the same manner as in Example 1.

As in Example 1, the hard-coating layer was tested for adhesiveness, transparency, and hardwearing properties.. The results of the tests were as follows: adhesiveness: 100/100; haze value: 0.5%; and ΔH: 7.2%. Thus, satisfactory results were obtained.

Example 3

163 parts of the same KAYARAD DPHA as used in Example 1 and 38.4 parts of trimellitic anhydride were placed into a flask such that the mole ratio of (dipentaerythritol pentaacrylate)/(trimellitic anhydride) was 1, and 100 parts of methylethyl ketone, 0.1 parts of hydroquinone monomethyl ether, and 1 part of N,N-dimethyl benzyl amine were added thereto. The mixture was then allowed to react at 80° C. for 8 hours. The resultant composition (III) included 66.9% solid portions and contained 47.3% of carboxyl group containing multifunctional acrylate and 19.2% of dipentaerythritol hexaacrylate.

100 parts of the composition (III) thus obtained was mixed with 70 parts of toluene and 1 Dart of benzyldimethylketal, thereby preparing an active-energy-ray-curable coating composition (C) having a composition as shown in Table 1.

Using this active-energy-ray-curable coating composition (C), a hard-coating-processed polycarbonate plate was: obtained in the same manner as in Example 1.

As in Example 1, the cured hard-coating layer was tested for adhesiveness, transparency, and hardwearing properties. The results of the tests were as follows: adhesiveness: 100/100; haze value: 0.5%; and ΔH: 6.5%. Thus, satisfactory results were obtained.

Example 4

The active-energy-ray-curable coating composition (A) obtained in Example 1 was applied to a transparent polyethylene terephthalate film having a thickness of 0.1 mm by using a bar coater such that the coating film thickness after drying was 5 μm, and was dried by heating at 80° C. for 5 minutes. Using this coating in the same way as in Example 1, a hard-coating-processed polyethylene terephthalate film was obtained.

The adhesiveness between the polyethylene terephthalate film and the hard coating layer formed thereon was evaluated. The adhesiveness proved to be 100/100. Thus, satisfactory adhesiveness was obtained.

Further, the transparency of the hard-coating-processed polyethylene terephthalate film was evaluated in terms of haze value (%). The result was 3.5%, which means a satisfactory level of transparency. The haze value of the 0.1 mm thick polyethylene terephthalate film before hard-coating process was 3.7%.

Next, the hardwearing properties of the coating was evaluated. ΔH was 6.1%, which means a satisfactory hardwearing properties. The same Taber's abrasion resistance test was conducted on a 0.1 mm thick polyethylene terephthalate film which had not undergone hard-coating processing, and the value of ΔH thereby obtained was 23.1%.

Example 5

The active-energy-ray-curable coating composition (A) obtained in Example 1 was applied to a transparent triacetyl cellulose film having a thickness of 0.1 mm by using a bar coater such that the coating film thickness after drying was 5 μm, and was dried by heating at 60° C. for 2 minutes. Using this coating in the same way as in Example 1, a hard-coating-processed triacetyl cellulose film was obtained.

The adhesiveness between the triacetyl cellulose film and the hard coating layer formed thereon was evaluated. The adhesiveness proved to be 100/100. Thus, satisfactory adhesiveness was obtained.

Further, the transparency of the hard-coating-processed triacetyl cellulose film was evaluated in terms of haze value (%). The result was 0.3%, which means a satisfactory level of transparency. The haze value of the 0.1 mm thick triacetyl cellulose film before hard-coating process was 0.2%.

Next, the hardwearing properties of the hard-coating was evaluated. ΔH was 6.0%, which means satisfactory hardwearing properties. The same Taber's abrasion resistance test was conducted on a 0.1 mm thick triacetyl cellulose film which had not undergone hard coating processing, and the value of ΔH thereby obtained was 32.5%.

Example 6

100 parts of the composition (I) obtained in Example 1, 66 parts of a colloidal silica using isopropyl alcohol as dispersing medium and having 30% solid portions (manufactured by Nissan Chemical Industries, Ltd.: IPA-ST), and 1 part of benzyl dimethyl ketal were mixed with each other, thereby obtaining an active-energy-ray-curable coating composition (D) having a composition as shown in Table 1.

Using this active-energy-ray-curable coating composition (D), a hard-coating-processed polycarbonate plate was obtained in the same way as in Example 1.

As in Example 1, the hard-coating layer was evaluated for adhesiveness, transparency, and hardwearing properties. The evaluation results were as follows: adhesiveness: 100/100; haze value: 0.4%; and ΔH: 4.2%. Thus, satisfactory results were obtained.

Example 7

A mixing process was conducted in the same manner as in Example 6 except that the amount of the colloidal silica having 30% solid portions was 670 parts, thereby obtaining an active-energy-ray-curable coating composition (E). In the same manner as in Example 6, a hard-coating-processed polycarbonate plate was obtained.

The cured coating layer was evaluated for adhesiveness, transparency, and hardwearing properties. The evaluation results were as follows: adhesiveness: 100/100; haze value: 0.6%; and ΔH: 6.5%. Thus, satisfactory results were obtained.

Example 8

100 parts of the composition (I) obtained in Example 1, 100 parts of a colloidal zinc oxide using toluene as dispersing medium and having 32% solid portions (manufactured by Sumitomo Cement Co., Lid: ZS-300), and 1 part of benzyl dimethyl ketal were mixed with each other, thereby obtaining an active-energy-ray-curable coating composition (F) having a composition as shown in Table 1.

Using this active-energy-ray-curable coating composition (F), a hard-coating-processed polyethylene terephthalate film was obtained in the same way as in Example 4.

As in Example 1, the coating layer was evaluated for adhesive-ness, transparency, and hardwearing properties. The evaluation results were as follows: adhesiveness: 100/100; haze value: 3.8%; and ΔH: 5.4%. Thus, satisfactory results were obtained.

Example 9

100 parts of the composition (I) obtained in Example 1, 200 parts of a colloidal antimony oxide using methyl alcohol as dispersing medium and having 30% solid portions (manufactured by Nissan Chemical Industries, Ltd.: AMT-130), and 1 part of benzyl dimethyl ketal were mixed with each other, thereby obtaining an active-energy-ray-curable coating composition (G) having a composition as shown in Table 1.

Using this active-energy-ray-curable coating composition (G), a hard-coating-processed triacetyl cellulose film was obtained in the same way as in Example 5.

As in Example 1, the coating layer was evaluated for adhesive-ness, transparency, and hardwearing properties. The evaluation results were as follows: adhesiveness: 100/100; haze value: 0.5%; and ΔH: 5.5%. Thus, satisfactory results were obtained.

Example 10

70 parts of methyl methacrylate, 30 parts of hydroxyethyl acrylate, and 150 parts of methylethyl ketone were mixed with each other, and heated to a temperature of 80° C. At this time, 0.3 parts of azobis isobutyronitrile was added to the mixture. Then, 2 hours after this temperature rise, another 0.3 parts of azobis isobutyronitrile was added to the mixture, which was then allowed to react at 80° C. for 8 hours, thereby obtaining a copolymer of methyl methacrylate and hydroxy ethyl acrylate having 40% solid portions.

100 parts of the composition (I) obtained in Example 1, 66 parts of a colloidal silica using isopropyl alcohol as a dispersing medium and having 30% solid portions (manufactured by Nissan Chemical Industries: IPA-ST), and 50 parts of the above copolymer were mixed with each other, thereby obtaining an active-energy-ray-curable coating composition (H) having a composition as shown in Table 1.

This active-energy-ray-curable coating composition (H) was applied to a 0.1 mm thick transparent polyethylene terephthalate film by using a bar coater, and dried by heating at 80° C. for 5 minutes to vaporize the methyl ethyl ketone and isopropyl alcohol, thereby obtaining a coating film having a thickness of 5 μm. The surface of the coating on the polyethylene terephthalate film after drying exhibited no tackiness. The coating film was irradiated with electron rays of 5 Mrad at an electron ray acceleration voltage of 175 kV and at a conveyor speed of 10 m/min. to effect electron ray-curing, thereby obtaining a hard coating layer.

As in Example 1, the hard-coating layer was tested for adhesiveness, transparency, and hardwearing properties. The results of the tests were as follows: adhesiveness: 100/100; haze value: 3.6%; and ΔH: 9.2%. Thus, satisfactory results were obtained.

Example 11

90 parts of methyl methacrylate, 10 parts of γ-methacryloyl oxypropyl trimethoxy silane, and 150 parts of methylethyl ketone were mixed with each other, and heated to a temperature of 80° C. At this time, 0.3 parts of azobis isobutyronitrile was added to the mixture. Then, 2 hours after this temperature rise, another 0.3 parts of azobis isobutyronitrile was added to the mixture, which was then allowed to react at 80° C. for 8 hours, thereby obtaining a 40% methyl ethyl ketone solution of an acrylic silicon resin having alkoxy silyl groups.

100 parts of the composition (I) obtained in Example 1, 66 parts of a colloidal silica using isopropyl alcohol as a dispersing medium and having 30% solid portions (manufactured by Nissan Chemical Industries: IPA-ST), and 50 parts of the above acrylic silicon resin were mixed with each other, thereby obtaining an active-energy-ray-curable coating composition (J) having a composition as shown in Table 1.

Using this active-energy-ray-curable coating composition (J), a hard-coating-processed polyethylene terephthalate film was obtained in the same way as in Example 10. The surface of the coating-film on the polyethylene terephthalate film after drying exhibited no tackiness. Thus, the film forming property of this coating composition (J) was ascertained.

As in Example 1, the cured hard-coating film was tested for adhesiveness, transparency, and hardwearing properties. The results of the tests were as follows: adhesiveness: 100/100; haze value: 3.7%; and ΔH: 8.9%. Thus, satisfactory results were obtained.

Comparative Example 1

50 parts of the same KAYARAD DPHA as used in Example 1, 50 parts of toluene, and] part of benzyl dimethyl ketal were mixed with each other, thereby preparing an active-energy-ray-curable coating composition (K) having a composition as shown in Table 1.

Using this active-energy-ray-curable coating composition (K), a hard-coating-processed polycarbonate plate was obtained in the same way as in Example 1.

As in Example 1, the coating was tested for adhesiveness, transparency, and hardwearing properties. The results of the tests were as follows haze value: 0.5%; and ΔH: 6.9% which are satisfactory values. However, the adhesiveness was as poor as 0/100.

Comparative Example 2

46.4 parts of hydroxy ethyl acrylate and 43.6 parts of pyromellitic dianhydride were placed into a flask such that mole ratio of (hydroxy ethyl acrylate)/(pyromellitic dianhydride) was 2, and 100 parts of methyl ethyl ketone, 0.1 parts of hydroquinone monomethyl ether, and 1 part of N,N-dimethyl benzyl amine were added to the mixture. The resultant mixture was allowed to react at 80° C. for 8 hours, thereby obtaining a pyromellitic diacryloyl oxyethyl ester (having 47.4% solid portions).

100 parts of the above pyromellitic diacryloyl oxyethyl ester (having 47.4% of solid portion) was-mixed-with 20 parts of the same KAYARAD DPHA as used in Example ], 70 parts of toluene, and 1 part of benzyl dimethyl ketal, thereby preparing an active-energy-ray-curable coating composition (L) having a composition as shown in Table 1.

Using this active-energy-ray-curable coating composition (L), a hard-coating-processed polycarbonate plate was obtained in the same way as in Example 1.

As in Example 1, the coating was tested for adhesiveness, transparency, and hardwearing properties. The results of the tests were as follows: adhesiveness: 100/100; and haze value: 0.6%, which are satisfactory. However, the ΔH was 25.8%. Thus, the hardwearing properties was unsatisfactory.

Comparative Example 3

50 parts of monoacryloyl phthalate oxyethyl ester, obtained from hydroxyethyl acrylate and phthalic anhydride (VISCOAT 2000, manufactured by Osaka Yuki Kagaku Kogyo Co.), was mixed with-30 parts of the same KAYARAD DPHA as used in Example 1, 100 parts of methyl ethyl ketone, 66 parts of a colloidal silica using isopropyl alcohol as a dispersing medium and having 30% solid portions (manufactured by Nissan Chemical Industries, Ltd.: IPA-ST), and 1.5 part of benzyl dimethyl ketal, thereby preparing an active-energy-ray-curable coating composition (M) having a composition as shown in Table Using this active-energy-ray-curable coating composition (M), a hard-coating-processed polycarbonate plate was obtained in the same way as in Example 4.

As in Example 1, the hard-coating layer was tested for adhesiveness, transparency, and hardwearing properties. The results of the tests were as follows: adhesiveness: 100/100; and haze value: 3.7%, which are satisfactory. However, the ΔH was 18.9%. Thus, the hardwearing properties was unsatisfactory.

The compositions and hard-coating layer evaluation results of the above examples and comparative examples are given in Tables 1 and 2.

In Tables 1 and 2 each abbraviation represents the following:
DPPA: dipentaerythritol pentaacrylate;
PMDA: pyromellitic dianhydride;
PET(3)A: pentaerythritol triacrylate;
TMA: trimellitic anhydride
DPHA: dipentaerythritol hexaacrylate;
PET(4)A: pentaerythritol tetraacrylate;
MEK: methyl ethyl ketone;
DMBA: N,N-dimethyl benzylamine;
HEA: hydroxyethyl acrylate;
MMA: methyl methacrylate;
MPTMS: γ-methacryloyloxypropyl trimethoxysilane;
PC: polycarbonate;
PET: polyethylene terephthalate;
TAC: triacetyl cellulose.

TABLE 1

| | Composition | A | B | C | D | E | F | G | H | J | K | L | M |
|---|---|---|---|---|---|---|---|---|---|---|---|---|---|
| ($a_1$) | DPPA.PMDA (2:1) addition product | 44.3 | — | — | 44.3 | 44.3 | 44.3 | 44.3 | 44.3 | 44.3 | — | — | — |
| ($a_2$) | PET(3)A.PMDA (2:1) addition product | — | 39.0 | — | — | — | — | — | — | — | — | — | — |
| ($a_3$) | DPPA.TMA (1:1) addition product | — | — | 47.3 | — | — | — | — | — | — | — | — | — |
| ($b_1$) | DPHA | 20.4 | 5.3 | 19.2 | 20.4 | 20.4 | 20.4 | 20.4 | 20.4 | 20.4 | 17.8 | 7.1 | 10.7 |
| ($b_2$) | DPPA | — | 9.7 | — | — | — | — | — | — | — | 32.2 | 12.9 | 19.3 |
| ($b_3$) | PET(4)A | — | 12.6 | — | — | — | — | — | — | — | — | — | — |
| | HEA.PMDA (2:1) | — | — | — | — | — | — | — | — | — | — | 47.4 | — |
| | VISCOAT 2000 | — | — | — | — | — | — | — | — | — | — | — | 50.0 |
| (c) | Organic solvent | | | | | | | | | | | | |
| | MEK | 35.0 | 47.9 | 33.1 | 35.0 | 35.0 | 35.0 | 35.0 | 65.0 | 65.0 | — | 52.61 | 100.0 |
| | toluene | 70.0 | 70.0 | 70.0 | — | — | 68.0 | — | — | — | 50.0 | 70.0 | — |
| | isopropyl alcohol | — | — | — | 46.2 | 469.0 | — | — | 46.2 | 46.2 | — | — | 46.2 |
| | methyl alcohol | — | — | — | — | — | — | 140.0 | — | — | — | — | — |
| (d) | benzyl dimethyl ketal | 1.0 | 1.0 | 1.0 | 1.0 | 1.0 | 1.0 | 1.0 | | | 1.0 | 1.0 | 1.5 |
| ($e_1$) | $SiO_2$ | — | — | — | 19.8 | 201.0 | — | — | 19.8 | 19.8 | — | — | 19.8 |
| ($e_2$) | $ZnO_2$ | — | — | — | — | — | 32.0 | — | — | — | — | — | — |
| ($e_3$) | $Sb_2O_5$ | — | — | — | — | — | — | 60.0 | — | — | — | — | — |
| ($f_1$) | MMA.HEA (70:30) copolymer | — | — | — | — | — | — | — | 20.0 | — | — | — | — |
| ($f_2$) | MMA.MPTMS (90:10) copolymer | — | — | — | — | — | — | — | — | 20.0 | — | — | — |
| | (b)/(a) | 0.46 | 0.71 | 0.41 | 0.46 | 0.46 | 0.46 | 0.46 | 0.46 | 0.46 | ∞ | ∞ | ∞ |
| | (e)/{(a) + (b)} | — | — | — | 0.31 | 3.11 | 0.49 | 0.93 | 0.31 | 0.31 | — | — | 0.25 |
| | (f)/{(a) + (b) + (e)} | — | — | — | — | — | — | — | 0.24 | 0.24 | — | — | — |

TABLE 2

| Composition | Example 1 A | 2 B | 3 C | 4 A | 5 A | 6 D | 7 E | 8 F |
|---|---|---|---|---|---|---|---|---|
| substrate | PC | PC | PC | PET | TAC | PC | PC | PET |
| adhesiveness | 100/100 | 100/100 | 100/100 | 100/100 | 100/100 | 100/100 | 100/100 | 100/100 |
| Haze value (%) | 0.4 | 0.5 | 0.5 | 3.5 | 0.3 | 0.4 | 0.6 | 3.8 |
| hardwearing properties (ΔH%) | 5.4 | 7.2 | 6.5 | 6.1 | 6.0 | 4.2 | 6.5 | 5.4 |

| Composition | Example 9 G | 10 H | 11 J | Comparative Example 1 K | 2 L | 3 M |
|---|---|---|---|---|---|---|
| substrate | TAC | PET | PET | PC | PC | PET |
| adhesiveness | 100/100 | 100/100 | 100/100 | 0/100 | 100/100 | 100/100 |
| Haze value (%) | 0.5 | 3.6 | 3.7 | 0.5 | 0.6 | 3.7 |
| hardwearing properties (ΔH%) | 5.5 | 9.2 | 8.9 | 6.9 | 25.8 | 18.9 |

What is claimed is:

1. An active-energy-ray curable coating composition comprising:
   (a) a carboxyl-group containing multifunctional acrylate obtained by reacting a compound having one or more acid anhydride groups with a hydroxyl-group containing multifunctional acrylate having a hydroxyl group and at least three acryloyl groups;
   (b) a multifunctional acrylate having at least three acryloyl groups in the molecule;
   (c) an organic solvent; and
   (d) optionally, photopolymerization initiator,
   wherein the ratio by weight of component (b) to component (a) is 0.01 to 2, wherein the amount of component (c) is large enough to dissolve components (a) and (b), and wherein the amount of component (d) is 0 to 10 wt % of the sum total of the weights of components (a) and (b).

2. The coating composition according to claim 1, wherein said compound having one or more acid anhydride groups is a compound having two acid anhydride groups selected from the group consisting of pyromellitic dianhydride, 3,3', 4,4'-benzophenone tetracarboxylic dianhydride, 4,4'-biphthalic anhydride, 4,4'-oxodiphthalic anhydride, 4,4'-(hexafluoroisopropylidene)diphthalic anhydride, 1,2,3,4-cyclopentane tetracarboxylic dianhydride, 5-(2,5-dioxotetrahydroluryl)-3-methyl-3-cyclohexene-1,2-dicarboxylic anhydride, 4-(2,5-dioxo-tetrahydrofuran-3-yl)-tetralin-1,2-dicarboxylic anhydride, 3,4,9,10-perylene tetracarboxylic dianhydride, and bicyclo [2.2.2]octo-7-en-2, 3,5,6-tetracarboxylic dianhydride.

3. The coating composition according to claim 1, wherein said hydroxyl group containing multifunctional acrylate is an acrylate selected from the group consisting of pentaerythritol triacrylate, dipentaerythritol tetraacrylate, and dipentaerythritol pentaacrylate.

4. The coating composition according to claim 1, wherein component (b) is a substance selected from the group consisting of dipentaerythritol hexaacrylate, dipentaerythritol pentaacrylate, and mixtures thereof.

5. The coating composition according to claim 1, wherein the coating composition further comprises a component (e), which is a colloidal metal oxide, in such a proportion that the ratio by weight of component (e)/{component (a)+component (b)} is 0.01 to 10.

6. The coating composition according to claim 5, wherein said colloidal metal oxide (e) is selected from the group consisting of colloidal silica, colloidal antimony oxide, and colloidal zinc oxide.

7. The coating composition according to claim 5, wherein said active-energy-ray curable coating composition further comprises a component (f), which is an acrylic resin having a molecular weight of 50,000 to 500,000, such that the ratio by weight of component (e)/{component (a)+ component (b)} is 0.01 to 10 and that the ratio by weight of component (f)/{component (a)+ component (b)+ component (e)} ranges from 0.01 to 0.5.

8. The coating composition according to claim 7, wherein said acrylic resin (f) is a copolymer of methyl methacrylate and hydroxy ethyl acrylate or a copolymer of methyl methacrylate and γ-methacryloyloxypropyl trimethoxy silane.

9. The coating composition according to claim 7, wherein said acrylic resin (f) is an acrylic resin having hydroxyl groups or alkoxy silyl groups.

* * * * *